US 7,945,622 B1

(12) United States Patent
Pegg

(10) Patent No.: US 7,945,622 B1
(45) Date of Patent: May 17, 2011

(54) USER-AWARE COLLABORATION PLAYBACK AND RECORDING

(75) Inventor: Nigel Pegg, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 167 days.

(21) Appl. No.: 12/243,819

(22) Filed: Oct. 1, 2008

(51) Int. Cl.
*G06F 15/16* (2006.01)
*G06F 3/00* (2006.01)
(52) U.S. Cl. .................. 709/204; 715/753; 709/206
(58) Field of Classification Search .................. 709/204, 709/206; 715/753
See application file for complete search history.

(56) References Cited

U.S. PATENT DOCUMENTS

| | | | |
|---|---|---|---|
| 6,321,252 B1 | 11/2001 | Bhola | |
| 6,342,906 B1 | 1/2002 | Kumar et al. | |
| 6,343,313 B1* | 1/2002 | Salesky et al. ................ | 709/204 |
| 6,357,042 B2 | 3/2002 | Srinivasan et al. | |
| 6,721,921 B1 | 4/2004 | Altman | |
| 6,915,512 B1 | 7/2005 | Miyajima | |
| 7,085,558 B2 | 8/2006 | Berstis et al. | |
| 7,099,798 B2 | 8/2006 | Yu et al. | |
| 7,133,831 B2 | 11/2006 | Brown et al. | |
| 7,143,136 B1 | 11/2006 | Drenan et al. | |
| 7,213,051 B2 | 5/2007 | Zhu | |
| 7,248,684 B2 | 7/2007 | Caspi et al. | |
| 7,295,752 B1 | 11/2007 | Jain et al. | |
| 7,349,944 B2* | 3/2008 | Vernon et al. ................. | 709/204 |
| 7,421,069 B2* | 9/2008 | Vernon et al. ............. | 379/204.01 |
| 7,590,941 B2* | 9/2009 | Wee et al. ..................... | 715/753 |
| 7,634,533 B2 | 12/2009 | Rudolph et al. | |
| 2003/0208541 A1 | 11/2003 | Musa | |
| 2004/0107256 A1 | 6/2004 | Odenwald et al. | |
| 2004/0107270 A1 | 6/2004 | Stephens et al. | |
| 2004/0181577 A1 | 9/2004 | Skurikhin et al. | |
| 2004/0189700 A1 | 9/2004 | Mandavilli et al. | |
| 2004/0205452 A1 | 10/2004 | Fitzimons et al. | |
| 2005/0071440 A1 | 3/2005 | Jones et al. | |
| 2005/0198006 A1 | 9/2005 | Boicey et al. | |
| 2006/0026251 A1 | 2/2006 | Cheng et al. | |
| 2006/0026502 A1* | 2/2006 | Dutta ............................ | 715/511 |
| 2006/0143043 A1* | 6/2006 | McCallie et al. ................ | 705/2 |
| 2006/0171515 A1 | 8/2006 | Hintermeister et al. | |
| 2006/0200520 A1* | 9/2006 | Vernon et al. ................. | 709/204 |

(Continued)

FOREIGN PATENT DOCUMENTS

EP  1614288  11/2004

(Continued)

OTHER PUBLICATIONS

"ESPRE Live Features: Many-to-many video conferencing", [Online]. Retrieved from the Internet: <URL:http://www.espresolutions.com/pdf/ESPRE.pdf>,4 pgs.

(Continued)

*Primary Examiner* — Philip J Chea
(74) *Attorney, Agent, or Firm* — Schwegman Lundberg & Woessner, P.A.

(57) ABSTRACT

Various embodiments include one or more of systems, methods, software, and data structures for user-aware time-shifted playback and recording of real-time collaborations, such as web conferences. Some embodiments include recording and presenting public and private collaboration data for time-shifted playback. Private collaboration data includes collaboration data intended for viewing by less than all collaboration participants. Further systems, methods, software, and data structures are disclosed.

14 Claims, 9 Drawing Sheets

U.S. PATENT DOCUMENTS

| | | | |
|---|---|---|---|
| 2007/0081522 A1* | 4/2007 | Apelbaum | 370/352 |
| 2007/0118794 A1 | 5/2007 | Hollander et al. | |
| 2007/0192410 A1 | 8/2007 | Liversidge et al. | |
| 2008/0005244 A1* | 1/2008 | Vernon et al. | 709/204 |
| 2008/0130525 A1 | 6/2008 | Jansen et al. | |
| 2008/0189365 A1 | 8/2008 | Narayanaswami et al. | |
| 2008/0320081 A1 | 12/2008 | Biswas et al. | |
| 2009/0049129 A1 | 2/2009 | Faisal et al. | |
| 2009/0089379 A1 | 4/2009 | Pegg | |
| 2009/0204906 A1* | 8/2009 | Irving | 715/753 |

FOREIGN PATENT DOCUMENTS

| | | |
|---|---|---|
| JP | 2004140678 A | 5/2004 |
| JP | 2005341015 A | 12/2005 |
| WO | WO-2009042416 A1 | 4/2009 |

OTHER PUBLICATIONS

"Video Conferencing: P2P Solution From VSee Launches New Free Full Collaboration Version", [Online]. Retrieved from the Internet: <URL:http://www.masternewmedia.org/news/2007/03/05/video_conferencing_p2p_solution_from.htm>,(May 5, 2007),18 pgs.

"U.S. Appl. No. 11/863,100, Non-Final Office Action mailed Jun. 11, 2010", 21.

"International Search Report mailed".

Chabert, A., et al., "Java Object-Sharing in Habanero", *Communications of the Association for Computing Machinery* vol. 41 (6), (Jun. 1, 1998),69-76.

Handley, et al., "Session Initiation Protocol", *RFC 2543: IETF*, (Mar. 1999),1-153.

Lukasz, B., et al., "TANGO—A Collaborative Enviornment for the World-Wide Web", *Northeast Parallegal Architectures Center, Syracuse University*, URL://http://citeseerx.ist.psu.edu/viewdoc/summary?doi=10.1.1.52.768.

Morrison, D., et al., "Lotus Sametime Application Develoment Guide", *Internet Citation*, URL:http://www.redbooks.ibm.com/redbooks/pdfs/sg245651.pdf,(May 2000).

"U.S. Appl. No. 11/863,100, Non-Final Office Action mailed Dec. 22, 2010", 18 pgs.

"U.S. Appl. No. 11/863,100, Response filed Oct. 12, 2010 to Non-Final Office Action mailed Jun. 11, 2010", 12 pgs.

"U.S. Appl. No. 11/940,635, Non-Final Office Action mailed Sep. 13, 2010", 33 pgs.

"U.S. Appl. No. 11/940,635, Response filed Dec. 13, 2010 to Non-Final Office Action mailed Sep. 13, 2010", 14 pgs.

"U.S. Appl. No. 12/243,808, Non-Final Office Action mailed Dec. 30, 2010", 12 pgs.

* cited by examiner

USER-AWARE COLLABORATION PLAYBACK AND RECORDING

BACKGROUND INFORMATION

Meetings among a number of participants may be held as collaborative sessions in an online meeting. In particular, application programs now offer the ability for participants to connect across the Internet to share voice, video, application views, and other data in real time for meetings, presentations, training, and other purposes.

DETAILED DESCRIPTION

Figure 1:
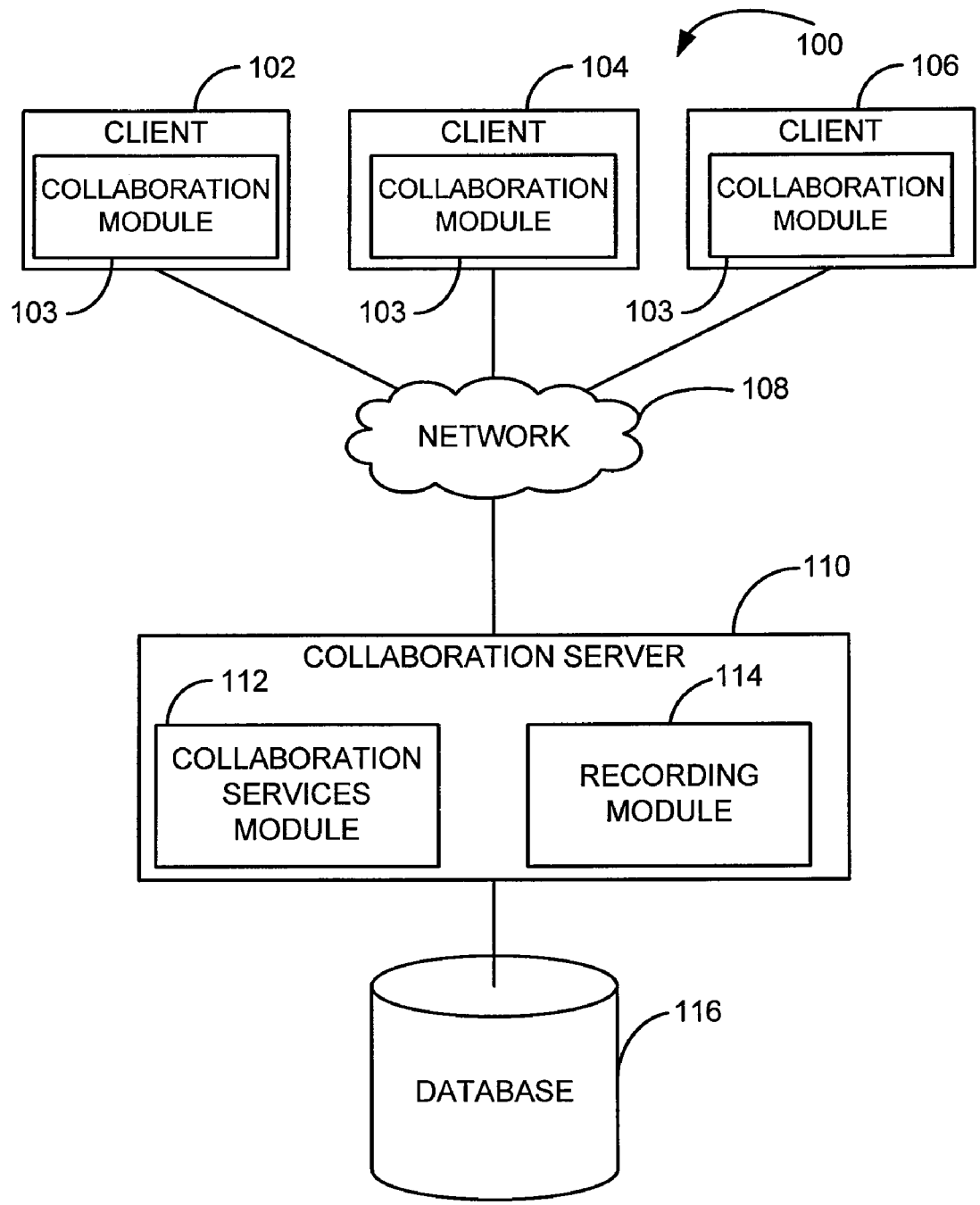
FIG. 1 is a block diagram of a system according to an example embodiment.

Online meetings, often referred to as online collaboration sessions, are becoming quite common as technology matures and travel costs become prohibitive to gathering people from differing locations. Typical collaboration sessions involve participants visiting a particular network site, such as a web page, and log in. If participants do not join on time to view an entire collaboration session, then they will miss portions, if not all, of the collaboration session unless the collaboration session is recorded. However, recording of collaboration sessions is not common.

Further, even when a session is recorded, viewing is not permitted until after the session is complete and the recording has been posted. Participants viewing a recorded collaboration session are limited to being simple viewers of the collaboration session and are not permitted to provide any input to the collaboration session. Participation is limited to mechanisms, such as email, that reside outside of the recorded collaboration session. Additionally, if private input is received within a collaboration session that is intended for distribution to less than all participants, the recorded collaboration session will not include that data, as mechanisms do not exist to limit the viewing of such private input.

Various embodiments described and illustrated herein include one or more of systems, methods, software, and data structures that allow participants to join a collaboration session after it has already started, and to view the collaboration session in a time-shifted manner. For example, a participant may rewind the collaboration session already in progress to a point prior to the current time, such as the beginning, and view the collaboration session going forward from that point.

Some embodiments allow the participant to adjust a playback speed at which the collaboration session is presented to a speed that is faster or slower than a speed at which the collaboration session was originally presented. Thus, a late-joining participant may set a playback speed at one-and-a-half times the original speed and potentially catch up to a live stream of the collaboration session. Further, if a collaboration session is recorded and stored for later viewing by participants, using the various mechanisms provided herein, participants may control playback of a recorded collaboration session with rewind, fast forward, pause, play, and playback speed controls. These and other embodiments may allow participants, whether viewing a live, time-shifted while in progress, or recorded collaboration session, to submit and view private collaboration session input intended for viewing by less than all participants.

As used herein, the term "collaboration session" comprises sharing multimedia data among two or more participants. For example, the collaborative session may comprise sharing multimedia data among multiple participants using client devices coupled over a network. The client devices may be coupled using a collaboration server or in a peer-to-peer fashion. An example of a collaborative session may comprise any type of online meeting. For example, a collaborative session may comprise an electronic presentation by one or more persons that is shared over a network with other person(s). The electronic presentation may comprise various types of multimedia. Examples of the type of data that may form part of a collaborative session may be audio, video, slide presentations, a shared white board, display of polling results, chat log, a window that displays the participants, etc. Participants may be allowed to contribute input to a collaboration session.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. The following description is, therefore, not to be taken in a limited sense, and the scope of the inventive subject matter is defined by the appended claims.

The functions or algorithms described herein may be implemented in hardware, software or a combination of software and hardware in one embodiment. The software comprises computer executable instructions stored on computer readable medium such as memory, hard disk, removable storage, or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

FIG. 1 is a block diagram of a system 100 according to an example embodiment. The system includes clients 102, 104, 106 that each include a collaboration module 103. The collaboration modules 103 connect to one or more collaboration servers 110 over a network 108 to participate in collaboration sessions. The collaboration server 110 includes a collaboration services module 112 and a recording module 114. The collaboration server 110 may also be operably connected to a database 116 and/or some other local or remote storage mechanism or location.

The clients 102, 104, 106 may be virtually any type of computing device capable of connecting to the collaboration server 110 over the network 108, so long as they include a collaboration module 103, perhaps cooperating with or forming part of an application program (e.g., a word processing program, a spreadsheet program, or a presentation program) that is compatible with the collaboration services module 112 on the collaboration server 110. Examples of such client 102, 104, 106 computing devices may include personal computers, mobile computing devices such as smart phones, set-top boxes, and other similar computing devices.

The collaboration module 103 is operable on the clients 102, 104, 106 to implement collaboration services offered by the collaboration services module 112. The collaboration module 103 is operable to capture one or more of data, gestures, video, audio, and the like within one or more computer applications on the clients 102, 104, 106 and to transmit the captured data to the collaboration services module 112 over the network 108. The captured data may be transmitted as collaboration data to a data agnostic collaboration service of the collaboration services module 112. The collaboration data in such instances includes a representation of the captured data and an identifier of the particular collaboration session to which the captured data pertains. The collaboration services module 112 may then replicate the collaboration data and send, such as by streaming, the collaboration data to one or more collaboration modules 103 of other client 102, 104, 106 collaboration session participants. The collaboration modules 103 receive the collaboration data from the collaboration services module 112 and process the received collaboration to identify how the collaboration data is to be provided to a client 102, 104, 106 collaboration participant.

The collaboration data may be provided to any participant by replicating an action represented in the collaboration data within a computer program identified with regard to the data. Examples of such actions may include changing of a slide in a shared application view of a slide presentation, a drawing action within the bounds of a shared whiteboard, moving of a pointing device, and other actions. The collaboration data may also be provided by replicating data, opening an audio or video stream, playing audio or video data, replicating a gesture action with a gesture tool such as a mouse, or other action or data modification, deletion, creation, or insertion.

In some embodiments, the collaboration module 103 may leverage functionality of an application plug-in to perform one or more functions such as capturing, outputting, replicating, encoding, and/or decoding collaboration data. The plug-in may comprise the Adobe® Flash® player. However, in other embodiments, the plug-in may be a custom-developed piece of software that implements one or more services offered by a collaboration server.

A service, or services, offered by the collaboration services module 112 of the collaboration server 110 may be leveraged to allow client 102, 104, 106 computer applications to utilize collaboration functionality, such as through embedding of the collaboration module 103 within such a computer application. This provides the potential to develop any number of different kinds of client 102, 104, 106 applications that utilize the same collaboration services module 112. Accordingly, a developer may conveniently add new features to a computer application, leveraging one or more services offered by the collaboration services module 112. For example, one embodiment may expose a data and application agnostic collaboration service that may be used by client 102, 104, 106 applications to facilitate collaborations with other computer application.

Previous collaboration applications required that everything performed by a server be tightly bound to one specific client. To the contrary, some embodiments may include a cloud of collaboration servers 110, dedicated to provisioning collaboration services through collaboration services modules 112, which may host collaboration rooms or sessions of virtually any client. Further, any number of variations and types of clients may be specifically built and embedded within other applications, such as a graphics editing application, a page description language view application, a word processing application, and other typical stand alone application types. Some embodiments may also include provisioning of collaboration services within websites allowing collaboration between team members, communication between a customer and merchant, buyer and seller, teacher and student, friends and family, and others. Thus, although termed collaboration services, the use of such services is not so limited. The services of the collaboration services module 112 are communication tools, the use of which may be embedded within applications, websites, and other codes having a capability to call and utilize web services or other objects.

The collaboration module 103 may include playback controls that allow a collaboration session participant to move backward and forward within a collaboration session. The playback controls may also include a playback speed control to modify a speed at which a collaboration session is being presented to the collaboration participant. For example, during the course of a collaboration between multiple participants, a participant, through use of the playback controls, may quickly rewind a selected collaboration session, review a portion of the collaboration session, and fast forward back to a forward edge of the collaboration session being presented at a present time. Manipulation of the playback speed control modifies a rate at which the collaboration data is presented. The playback speed may be virtually any speed represented in a ratio where normal playback speed is about 1:1 and double playback speed is about 2:1. Other playback speeds may be specified in various embodiments, such as 1:2, where the playback will be at about one-half the speed at which the collaboration data was originally presented, 1.5:1, where the playback will be at about one and one-half times the speed at which the collaboration data was originally presented, or some other ratio. When a collaboration session is rewound and a playback speed faster than 1:1 is specified, the collaboration module 103 is operable to switch to a live mode upon catching up to the forward, live edge of the collaboration session. The playback controls may also be used when viewing recorded collaboration session. Audio, video, data messaging, and other collaboration data accumulated within the collaboration session can be rewound and played back in such embodiments.

The functionality provided by the playback controls may be facilitated in number of ways. In one embodiment, the collaboration module 103 may maintain a buffer of received collaboration data of a collaboration session being viewed. The buffer of collaboration data may be stored in a memory device, such as random access memory, on a hard disk, or other computer readable and writable medium. The collaboration module 103 may receive the collaboration data over the network 108 from the collaboration services module 112, present the collaboration data as discussed above, and maintain the collaboration data in the buffer to allow a participant to rewind and playback the collaboration data. When the participant is not viewing the collaboration session live, the received collaboration data will continue to be received and maintained in the buffer to be available for playback.

In another embodiment, collaboration module 103 may interact with a service of the collaboration services module 112, the recording module 114, or other module of the collaboration server 110 to request and receive recorded collaboration session collaboration data as needed according to input received via the playback controls. Other embodiments may include a hybrid solution of these two approaches, where a collaboration module 103 having a buffer with collaboration may also retrieve collaboration data as needed.

During playback of a recorded collaboration session, some embodiments allow the participant to add collaboration data to the collaboration session. For example, a participant may add a drawing to a shared whiteboard used within the collaboration session, send a text-based chat message to one or more other participants, or other collaboration data. The added collaboration data, upon receipt by the collaboration module 103, is forwarded to the collaboration services module 112, the recording module 114, or other module for storing with the recorded collaboration session.

In some embodiments, participants are able to designate that certain collaboration input be viewable only by certain other collaboration participants. Such collaboration input designated to be viewable only by certain other collaboration participants is referred to as private data.

In one embodiment, collaboration data may be received by the collaboration module 103 along with a designation of one or more participants allowed to view the private data. The collaboration module 103 may then add data to the private data designating which participants are able to view the private data. The private data is then transmitted over the network to the collaboration services module 112 which will then relay the private data only to the participants identified in the private data.

In another embodiment, the collaboration module 103 may encrypt the private data using encryption keys of the participants designated as allowed to view the private data. The encrypted private data is then transmitted over the network to the collaboration services module 112, which will then relay the encrypted private data to the collaboration modules 103 of all other participants.

Upon receipt of the encrypted private data, the collaboration modules 103 attempt to decrypt the encrypted private data. If the decryption is successful, the private data will be displayed, otherwise the private data may be discarded or otherwise ignored. The encryption keys in such embodiments may be public-private encryption key pairs of participants, with the public encryption keys exchanged via the collaboration services module 112. The encryption of the private data may be performed with an OR encryption with the public keys of multiple designated participants where the private key of any single designated participant can be used to decrypt the encrypted private data.

The collaboration server 110, as mentioned above, includes the collaboration services module 112 and the recording module 114. The collaboration server 110 may comprise a general-purpose server able to communicate over a network 108, such as the Internet. The collaboration server 110 may be considered an application server as it may provide functionality via a set of web services to a set of applications or other modules, such as the client 102, 104, 106 collaboration modules 103. The services of the collaboration server 110 may be provided via modules, or other object types, such as through the collaboration services module 112 and the recording module 114.

The collaboration services module 112 is application and data agnostic, meaning that the collaboration services module 112 allows any application to call the one or more collaboration services it provides, and the collaboration services may serve as a conduit for transmission of any collaboration data. For example, a client 102, 104, 106 application may be developed to utilize a general collaboration service. The general collaboration service may only require that data received from a first client collaboration application to be relayed to one or more other client collaboration applications include a minimal amount of specific data when the service is called. All other data included in the service call is just relayed to the other client collaboration applications. Further, the collaboration services of the collaboration services module 112 may only require that they be called in a particular manner, such as a proper formatting of the service calls, and do not require that they be called by a particular client program or by the collaboration module 103. As a result, the collaboration module 103 and any client 102, 104, 106 application may utilize the services of the collaboration services module 112 to collaborate with virtually any type of data desired.

In some embodiments, collaboration data transmitted to the collaboration services module 112 may be designated as including private data for distribution to less than all collaboration session participants. In such instances, the collaboration data received may include a listing of participants authorized to view the private data, such as by user identifiers or an identifier of a group defined in location accessible by the collaboration services module 112 to permit the collaboration services module to identify which participants the private data is to be sent to. The private data is then sent only to those participants authorized to view the private data. In embodiments discussed above where the private data is encrypted, the collaboration services module 112 simply relays the encrypted private data as it does public collaboration data without regard to the content or intended recipient of the collaboration data.

Public collaboration data refers to collaboration data distributed without viewing restriction as part of a collaboration session. Note that in some embodiments, being a participant of a collaboration session may requiring logging in to the collaboration session, such as through a service of the collaboration services module 112. Once logged in, in such embodiments, the data exchanged amongst all participants as part of the collaboration session is the public collaboration data. Private collaboration data is collaboration data designated as viewable only by certain other collaboration participants.

The recording module 114 is operable to receive collaboration data from collaboration sessions and store the collaboration data in a manner to be retrievable by a collaboration session. The collaboration data may be stored in the database 116, and/or some other storage location local or remote to the collaboration server 110. The recording module 114 includes services which may be called over the network 108 by remote clients 102, 104, 106 directly or through the collaboration services module 112 to trigger recording of a collaboration session. The recording module 114, in some embodiments, simply records received collaboration data with regard to a collaboration session upon receipt from the collaboration services module 112. In such instances, the collaboration services module 112 may be configured to always record, or to record upon receipt of a record command from one of the clients 102, 104, 106.

When configured or commanded to record a collaboration session, the collaboration services module 112 relays the received collaboration data the recording module 114 for storage. The recorded collaboration data may include private data. As the recording module 114 receives collaboration data, the collaboration data may be time-stamped and appended to collaboration data of a collaboration session already received and time-stamped. The time-stamp may be the time the collaboration data is received, a time relative to a time within an ongoing collaboration session, or another time that provides for time-synchronized indexing of the received collaboration data.

The recording module 114 may maintain a recorded collaboration session indefinitely. However, the recording module 114 may also maintain a recorded collaboration session for a limited period, such as a week, month, or other period. In some embodiments, the recording module 114 may operate as a buffer that maintains a recorded copy of the collaboration session while the collaboration session is originally presented, with additional time as necessary until all participants are finished viewing the collaboration session. This additional time may extend past the end of the original collaboration session, such as when a participant uses playback controls, as discussed above, to review portions of the collaboration session, and the playback extends beyond the ending time of the original session.

A service may be provided by one or both of the collaboration services module 112 and recording module 114 to service requests from client 102, 104, 106 collaboration modules 103 or other applications to view recorded collaboration sessions. Such requests are received and fulfilled in the same manner as a live collaboration session, except that rather than receiving a live stream of collaboration data, the collaboration data of the requested collaboration session is instead retrieved from the database 116 or other storage device or storage location where the collaboration data is stored.

Figure 2:
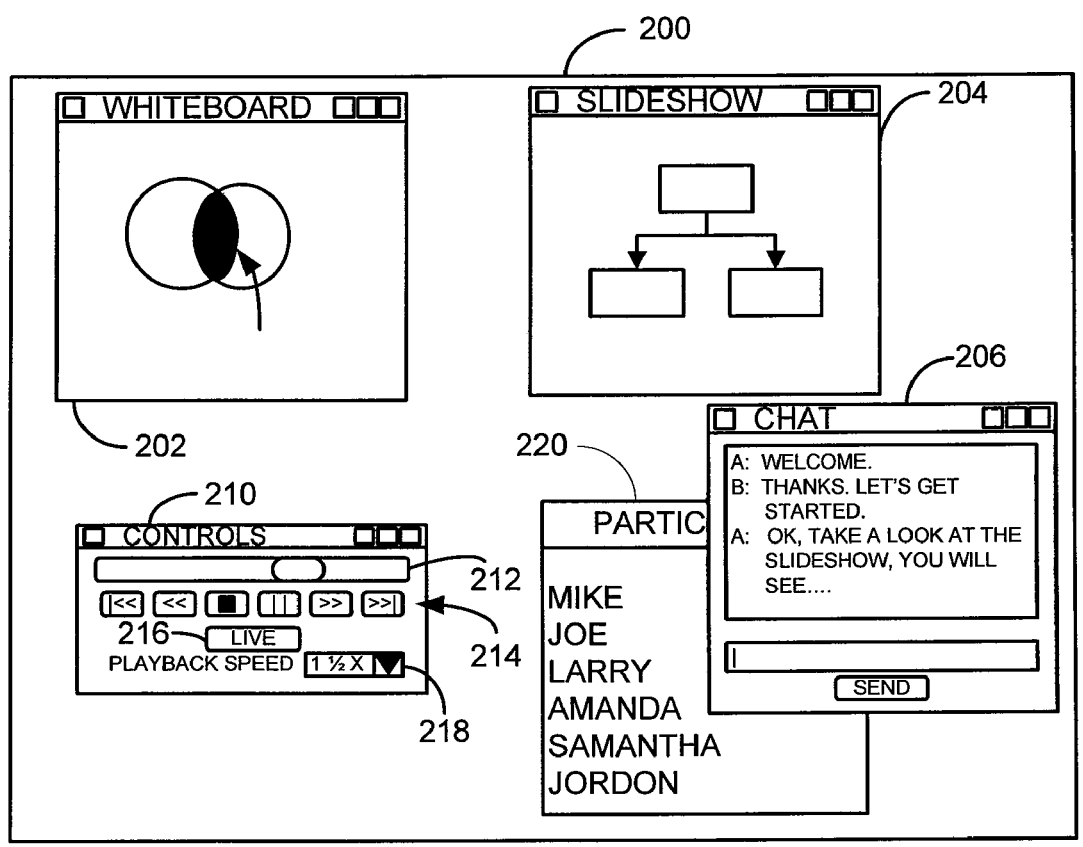
FIG. 2 is an illustration of video output including multiple user interfaces according to an example embodiment.

FIG. 2 is an illustration of video output 200 including multiple user interfaces according to an example embodiment. The video output 200 is an example of video output of a client computing device participating within a collaboration session. The user interfaces represented in the video output 200 include a shared whiteboard 202, a shared application view 204, a collaboration chat tool 206, playback controls 210, and a collaboration participant roster 220. These user interfaces may be part of a larger application and/or provided as part of the collaboration module 103, as discussed with regard to the FIG. 1.

The shared whiteboard 202 receives and shares whiteboard input with other participants. The shared application view 204 is a shared view of an application on a local or remote client. However, in some embodiments, the shared application view 204 may be local application instance presenting a file shared among participants. The collaboration data shared between the participant application instances may cause the local application instance to perform actions represented in the collaboration data. The collaboration chat tool 206 enables text-based chat between collaboration session participants. The collaboration participant roster 220 provides a listing of participants of a currently collaboration session.

Other user interfaces may be included in various embodiments and may include a webcam interface for sharing of webcam views between participants, audio controls, voice over IP (VOIP) controls, and other user interfaces and controls useful within a collaboration session. The applications, modules, applets, and other executable elements that provide the functionality of these user interfaces operate to capture, exchange, and display collaboration data with collaboration session participants over a network via data and application agnostic collaboration services.

The video output 200 also includes a representation of a playback control user interface 210. The playback controls user interface 210 provides playback controls including a scrub bar 212, action buttons 214, 216, and a playback speed selection drop-down list box 218. The playback controls user interface 210 is operable to receive input via its playback controls to modify a viewing position within a collaboration session being viewed. The playback controls, as discussed above, allow a participant to rewind, fast forward, pause, and jump around within the collaboration session being viewed. The scrub bar 212 provides a view of a relative location within an entire collaboration session and includes a slider within the scrub bar 212 that can be moved to cause a displayed position within the collaboration session to be modified. The action buttons 214, when selected, allow the participant to skip forward and backward, fast forward and rewind, stop, pause, and resume playback of the collaboration session. The action button 216 allows the participant to skip back to a live view of the collaboration session. The playback speed control 218, as discussed previously with regard to FIG. 1, allows the participant to modify the rate at which the collaboration data is presented when in a recorded or buffered viewing mode of the collaboration session.

Figure 3:
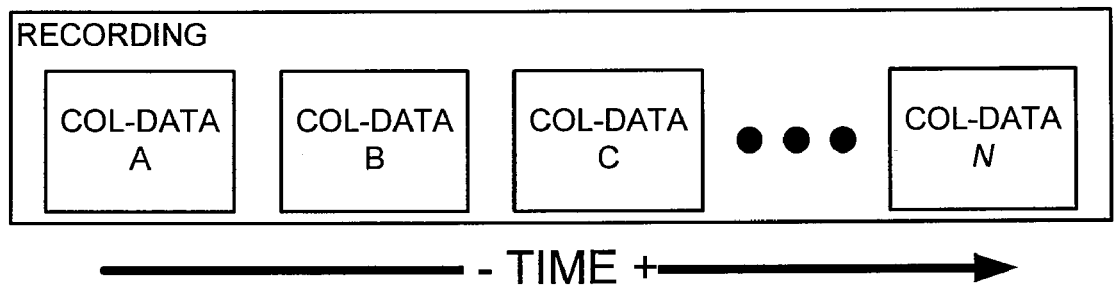
FIG. 3 illustrates a logical data structure according to an example embodiment.

FIG. 3 is a logical data structure illustration according to an example embodiment. The data structure includes a recording data structure that includes collaboration data (abbreviated as "COL-DATA") data structures A, B, C, and N, where N represents the Nth data structure in an unlimited number of collaboration data data structures. The recording data structure is a logical representation of a data structure that holds all the collaboration data of a collaboration session. The recording data structure may be stored in any number of ways, such as in a single flat file, multiple flat files, in a relational database, and other ways depending on the requirements and computing environment of particular embodiments.

The collaboration data data structures represent collaboration data from a collaboration session participants that is relayed to other participants using collaboration services, such as a data and application agnostic collaboration service, of a collaboration server. The collaboration data data structures A, B, C, and N typically include data such as an identifier of a collaboration session to which the data structure pertains and a data payload for delivery to other participants. As collaboration data data structures A, B, C, and N are added to the recording data structure, time indexing data can also be added to the collaboration data data structures A, B, C, and N. The time indexing data may comprise a time-stamp that identifies a time within a collaboration session recording that the data of respective collaboration data data structures is to be delivered, processed, or presented.

Figure 4:
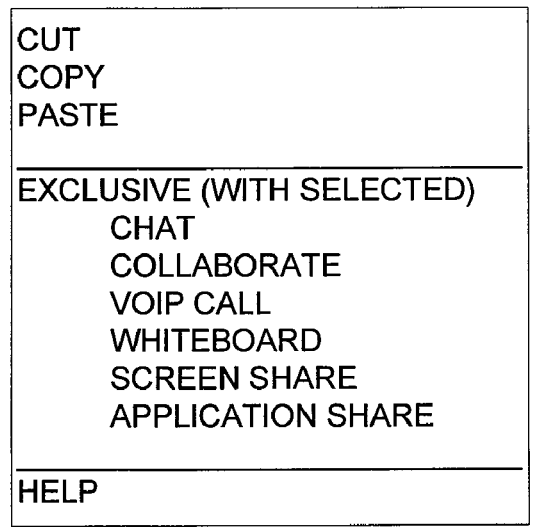
FIG. 4 illustrates a computer application menu according to an example embodiment.

FIG. 4 is an illustration of a menu of a computer application according to an example embodiment. The illustrated menu is an example of a mechanism that may be used to designate collaboration session input as private data when communicated to the collaboration server. The menu may be displayed as part of interacting with a roster of collaboration session participants, such as the collaboration participant roster 220 illustrated in FIG. 2. For example, one or more participants listed in the collaboration participant roster 220 may be selected and a right mouse button click, or other participant action, will cause the menu of FIG. 4 to be displayed. The menu provides various options for exclusive provisioning of collaboration data to the selected participants. These options may include exclusive chat data, such as the chat data obtained through the collaboration chat tool 206 of FIG. 2, exclusive collaboration as a whole, a VOIP call, shared whiteboard collaboration data, such as the data obtained through the shared whiteboard 202 of FIG. 2, screen sharing, and application sharing. The menu of FIG. 4 may be provided as a popup menu, such as with the right mouse button click as mentioned above, through an application menu available in a menu tool bar, a keyboard or action button shortcut, or some other mechanism. Similar mechanisms, although not illustrated, may also be provided to return a participant to a non-private collaboration mode.

Figure 6:
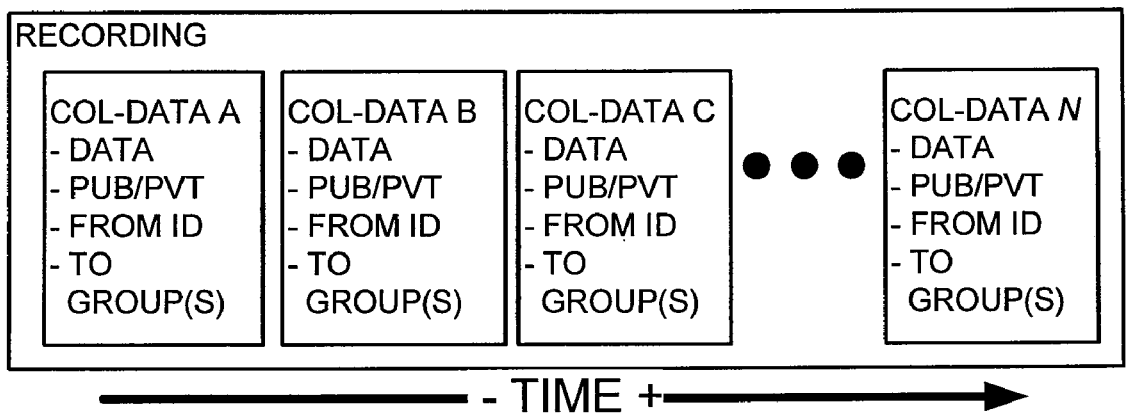
FIG. 6 illustrates a logical data structure according to an example embodiment.
Figure 7:
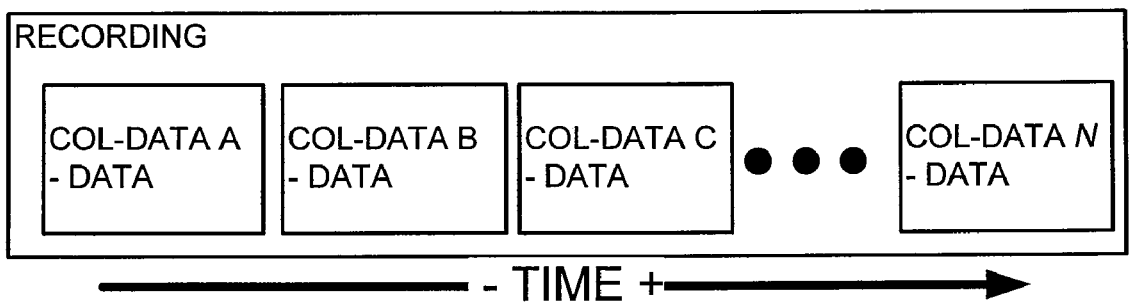
FIG. 7 illustrates a logical data structure according to an example embodiment.

Upon entering an exclusive, or private, collaboration mode though selection of a menu item as illustrated in FIG. 4 or some other mechanism, the format of the collaboration data data structure and recording data structure may change, depending on the particular embodiment. Examples of these varied data structures are illustrated in FIG. 5, FIG. 6, and FIG. 7.

Figure 5:
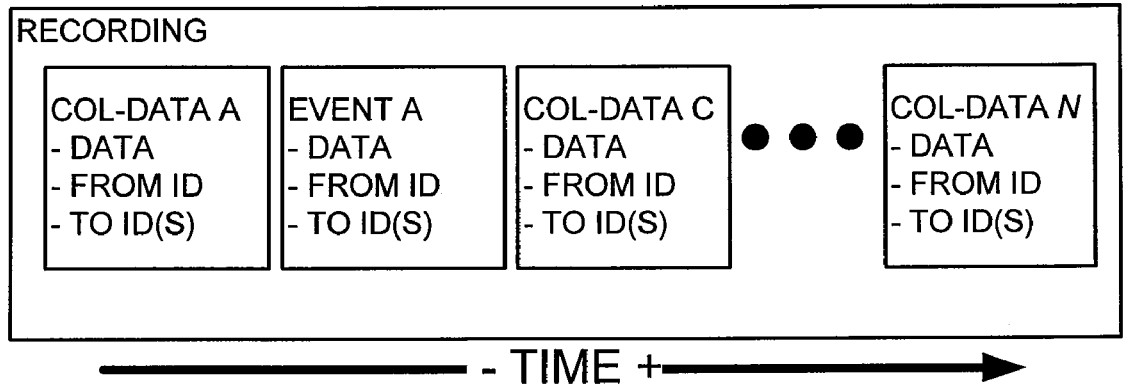
FIG. 5 illustrates a logical data structure according to an example embodiment.

FIG. 5 illustrates a logical data structure according to an example embodiment. The data structure of FIG. 5 includes a recording data structure that includes collaboration data (again abbreviated as "COL-DATA") data structures A, B, C, and N, where N designates the Nth data structure in an unlimited number of collaboration data data structures. The recording data structure is a logical representation of a data structure that holds all the collaboration data of a collaboration session. The recording data structure may be stored as discussed above with regard to FIG. 3.

The collaboration data data structures represent private collaboration data from a collaboration session participant that is relayed to one or more other participants using collaboration services, such as a data and application agnostic collaboration service of a collaboration server. The collaboration data data structures A, B, C, and N include a data payload, data identifying a participant the data is from (e.g., the source of the data), and data identifying to whom the data is intended (e.g., the recipient of the data). The data payload may be a free-form data element that may include clear-text or cipher text of virtually any type of data.

When a collaboration data data structure is received by the collaboration server, the collaboration services, such as the collaboration services module 112 of FIG. 1, will relay the data structure, in whole or in part, to the one or more collaboration participants identified in the data identifying the intended data recipient. The data identifying the source of the private data and the intended recipient may include one or more of a user identifier, a user group identifier, or other data sufficient to inform the collaboration services where to send the data. Although all of the collaboration data data structures A, B, C, and N are illustrated as including the from and to data, there is no such requirement. If such data is absent, the data may be assumed to be viewable by all participants.

FIG. 6 illustrates a logical data structure according to an example embodiment. The data structure of FIG. 6 is similar to the data structures of FIG. 3 and FIG. 5, but differs by having an additional data element (e.g., the PUB/PVT element) in the collaboration data data structures that explicitly identifies whether the collaboration data is public or private.

FIG. 7 illustrates a logical data structure according to an example embodiment. As in the data structures of FIG. 3, FIG. 5, and FIG. 6, the data structure of FIG. 7 also includes a recording data structure that includes collaboration data data structures A, B, C, and N, where N designates the Nth data structure among an unlimited number of collaboration data data structures A, B, C, and N. The collaboration data structures of FIG. 7 include a data payload in most embodiments, and may include further data. The data payload, or the entire data structure, when received by a collaboration service of a collaboration server, can be relayed to all participants regardless of whether the data payload is public or private. If the data payload is public, it is included in the data structure as clear text. If the data payload is private, the data payload may be encrypted, as discussed previously, perhaps to be decrypted only by participants for whom the private data is intended or who otherwise posses or obtain an appropriate decryption key. The encryption keys, in various embodiments, may include symmetric encryption keys or public/private encryption key pairs.

Figure 8:
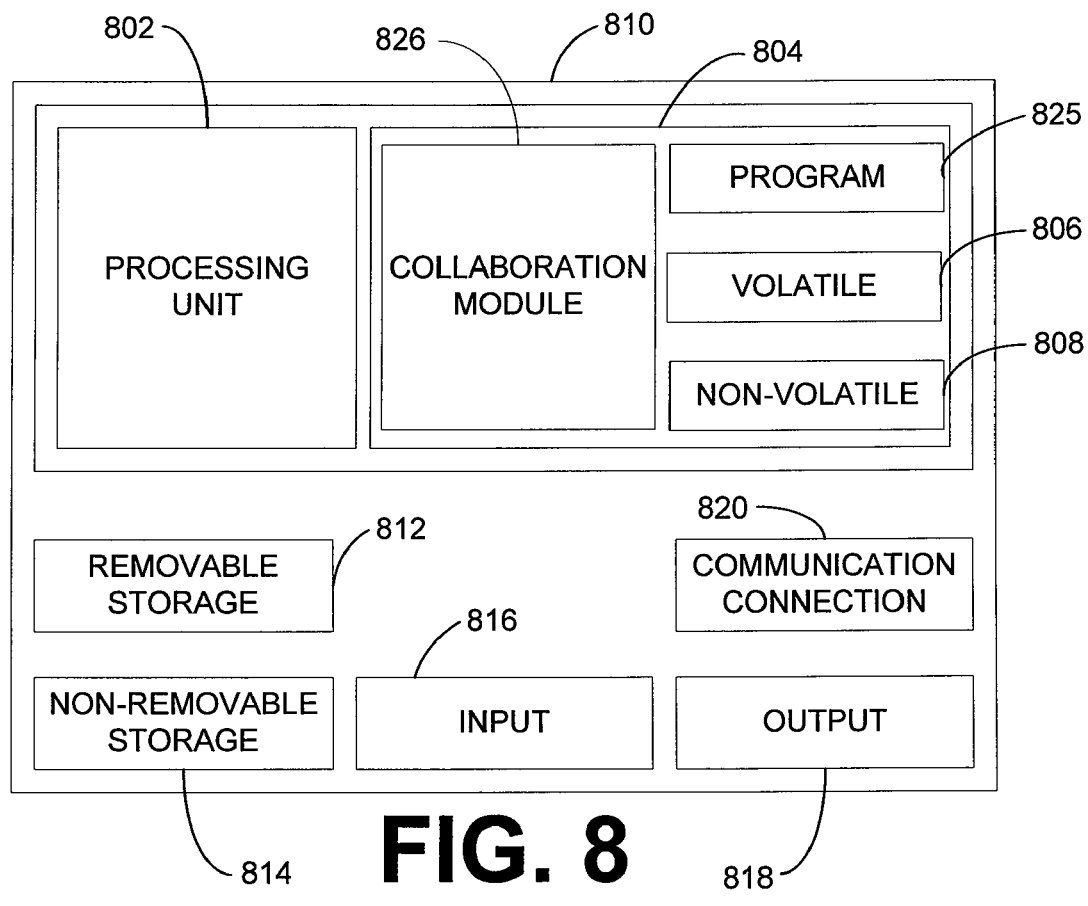
FIG. 8 is a block diagram of a computing device according to an example embodiment.

FIG. 8 is a block diagram of a computing device 810 according to an example embodiment. In one embodiment, multiple such computer systems are utilized in a distributed network to implement multiple components in a transaction based environment. The example computing device may be implemented as a client or a server, differing primarily only by installed software. An object oriented architecture may be used to implement such functions and communicate between the multiple systems and components. One example of a computing device 810 comprises a computer, which may include a processing unit 802, memory 804, removable storage 812, and non-removable storage 814. Memory 804 may include volatile memory 806 and non-volatile memory 808. Device 810 may include—or have access to a computing environment that includes—a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Device 810 may include or have access to a computing environment that includes input 816, output 818, and a communication connection 820. The device 810 may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the device 810. A hard drive, CD-ROM, and RAM are some examples of articles including a computer-readable medium. The computer-readable instructions may define a computer program 825. For example, the computer-readable instructions may the define a collaboration module 826, such as one or more of the collaboration modules 103, collaboration services module 112, and recording module 114 illustrated and described with regard to FIG. 1. The computer-readable instructions may also define a computer program operable on the processing unit 802 to perform one or more of the methods illustrated and described herein.

Figure 9:
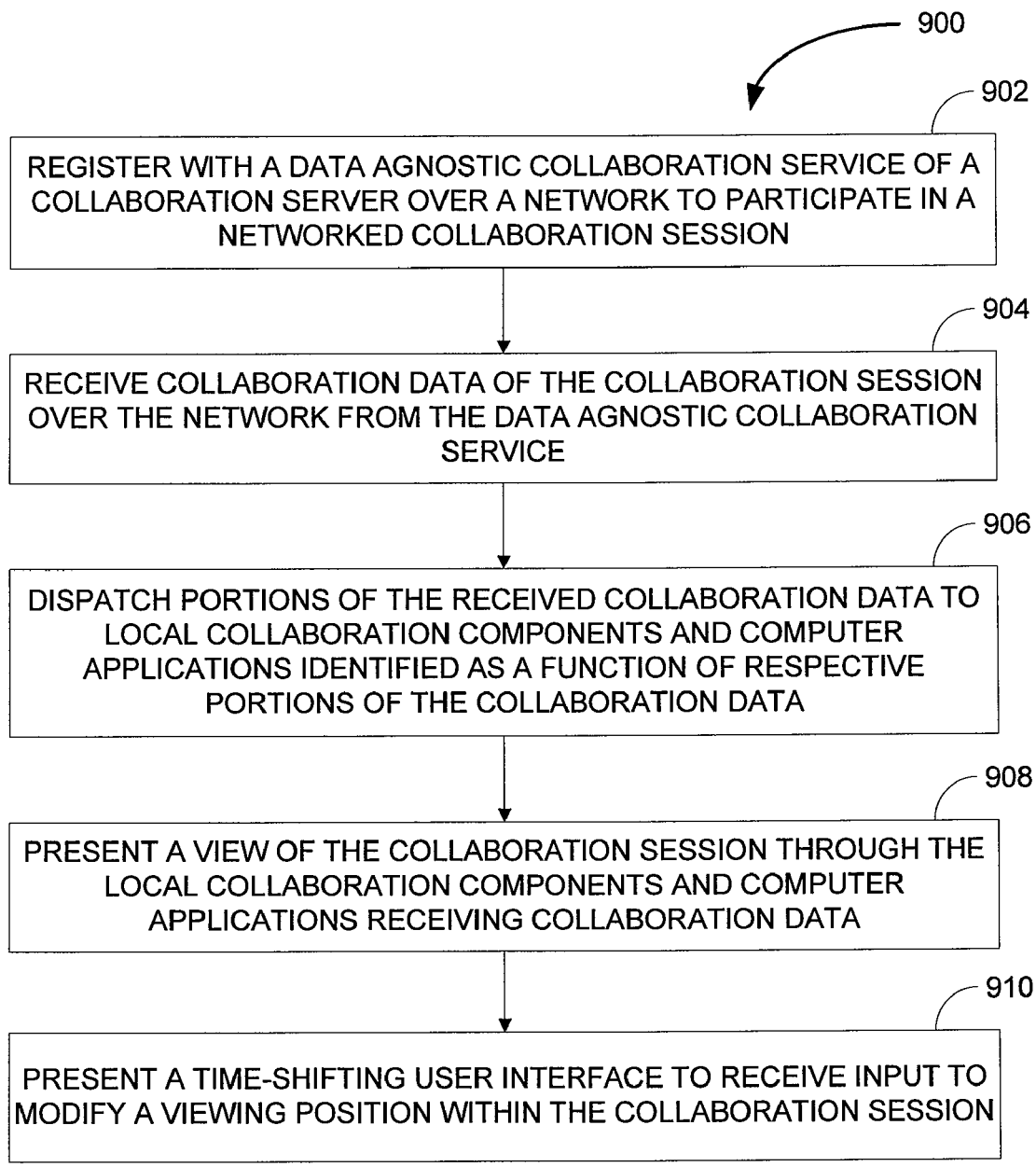
FIG. 9 is a flow diagram of a method according to an example embodiment.

FIG. 9 is a flow diagram of a method 900 according to an example embodiment. The method 900 is an example of a method that may be performed by a computing device, such as a client computing device, for participation in a collaboration session. The method 900 may include registering 902 with a data agnostic collaboration service of a collaboration server over a network to participate in a networked collaboration session. After registering 902, the method 900 may include receiving 904 collaboration data of the collaboration session over the network from the data agnostic collaboration service. Upon receiving 904 the collaboration data, the method 900 may include dispatching 906 portions of the received collaboration data to local collaboration components and computer applications identified as a function of respective portions of the collaboration data. The method 900 may further include presenting 908 a view of the collaboration session through the local collaboration components and computer applications receiving collaboration data and presenting 910 a time-shifting user interface to receive input to modify a viewing position within the collaboration session. An example of a time shifting user interface is the playback control user interface 210 illustrated and described above with regard to FIG. 2.

Identifying local collaboration components and computer applications as a function of respective portions of the collaboration data may include evaluating the received 904 collaboration data to identify a collaboration component or computer application capable of processing the collaboration data. The act of identifying may include identifying a type of data, such as a file type, evaluating metadata included in the collaboration data, or evaluating other data in the collaboration data. The local collaboration components may include a shared whiteboard component, a chat component, a roster component, and other components.

Some embodiments of the method 900 may also include caching the received 904 collaboration data, of a live or recorded collaboration session, in a memory and receiving input via the time-shifting user interface to modify the viewing position within the collaboration session to an identified position within the collaboration session. Such embodiments may then operate to retrieve cached collaboration data from the memory corresponding to the identified position within the collaboration session. The method 900 may then resume dispatching the portions of collaboration data and presenting the view of the collaboration data from the identified position in the collaboration session based on cached collaboration data. In such embodiments, the receiving 904 and the caching of collaboration data may continue until the collaboration session ends or a termination of at least one of the collaboration session and collaboration service.

Figure 10:
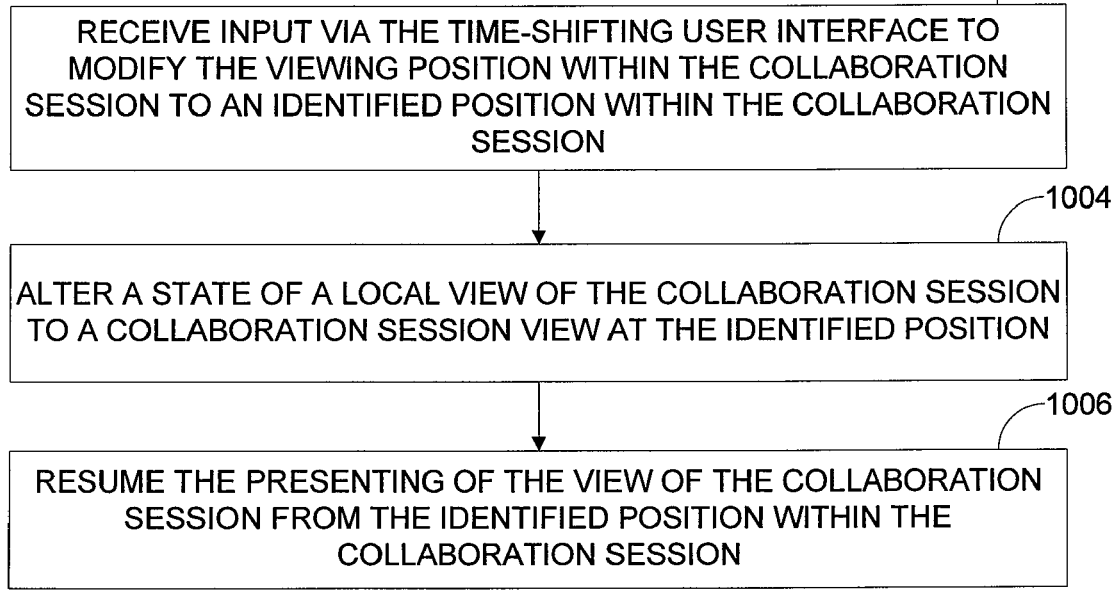
FIG. 10 is a flow diagram of a method according to an example embodiment.

FIG. 10 is a flow diagram of a method 1000 according to an example embodiment. The method 1000 is another example of a method that may be performed by a computing device, such as a client computing device, for participation in a collaboration session. The method 1000 may be performed by a client also performing the method 900 of FIG. 9. The method 1000 may include receiving 1002 input via the time-shifting user interface modifying a viewing position within a collaboration session to an identified position, and altering 1004 a state of a local view of the collaboration session to a collaboration session view at the identified position. The method 1000 may then operate to resume presenting the view of the collaboration session from the identified position within the collaboration session. The method 900 may further include requesting collaboration data from the collaboration service as a function of the identified position in the collaboration session. Additionally, the method 900 may include receiving further input via the time-shifting user interface specifying a playback speed of the collaboration session and then presenting the view of the collaboration session at the playback speed as specified in the further input received via the time-shifting user interface.

Another client computing device method includes receiving a first input to join a collaboration session facilitated by a collaboration service of a remote server on a network while the collaboration session is already in progress. Further actions may include joining the collaboration session, and receiving collaboration data of the collaboration session over the network from the collaboration service. The client computing device method may go on to include receiving a second input to rewind a view of the collaboration session to a time location prior to when the collaboration session was joined and requesting collaboration data over the network from the collaboration service beginning at the time location of the second input.

The client computing device method may also include receiving the collaboration data beginning at the time location of the second input over the network and presenting the received collaboration data beginning at the time location of the second input. The received collaboration data may include public and private collaboration data. In some embodiments, the client computing device method may also include receiving third input to pause the presenting of the received collaboration data and pausing the presenting of the received collaboration data.

Figure 11:
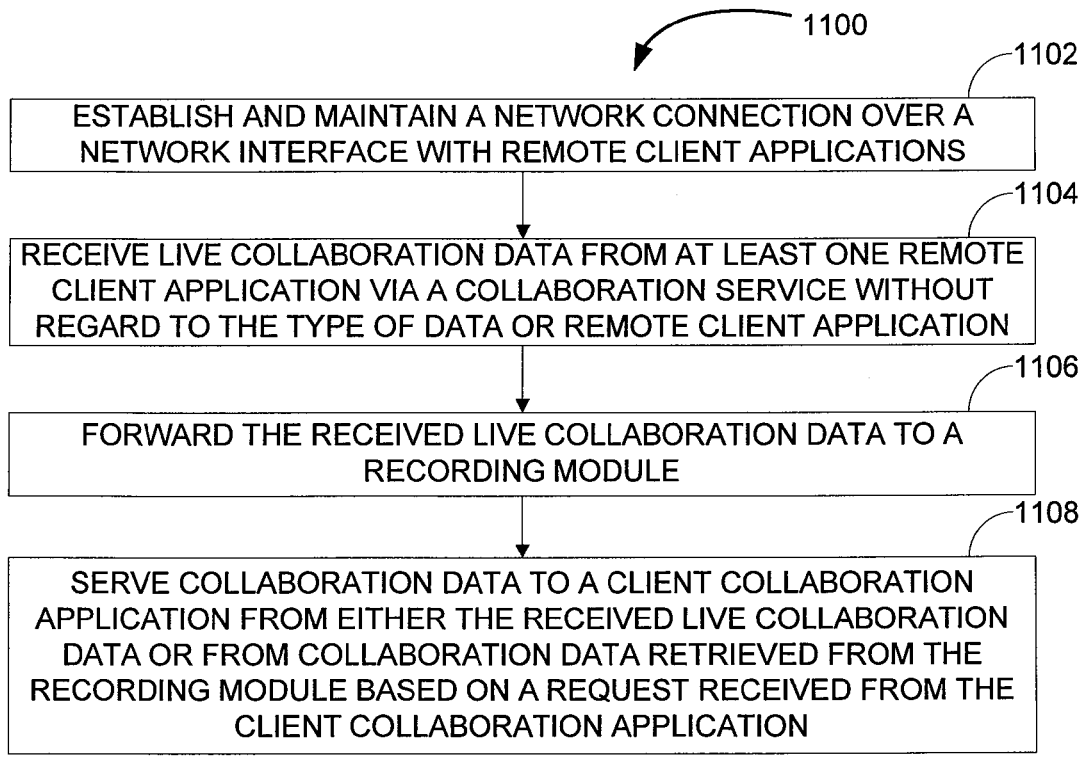
FIG. 11 is a flow diagram of a method according to an example embodiment.

FIG. 11 is a flow diagram of a method 1100 according to an example embodiment. The method 1100 is an example of a method that may be performed by a collaboration services module on a collaboration server. The method 1100 may include establishing and maintaining 1102 a network connection over a network interface with remote client applications, and receiving 1104 live collaboration data from at least one remote client application via a collaboration service without regard to the type of data or remote client application. The live collaboration data may be public or private collaboration data. The method 1100 may also include forwarding 1106 the received live collaboration data to a recording module and/or serving 1108 collaboration data to a client collaboration application—either from the received live collaboration data or from collaboration data retrieved from the recording module based on a request received from the client collaboration application.

Establishing and maintaining 1102 the network connection, in some embodiments, includes receiving input from a collaboration session initiator to initiate a collaboration session and receiving further input from the collaboration session initiator designating properties of the collaboration session. These properties may include a configuration setting instructing the collaboration module to forward 1106 the collaboration data to the recording module.

Figure 12:
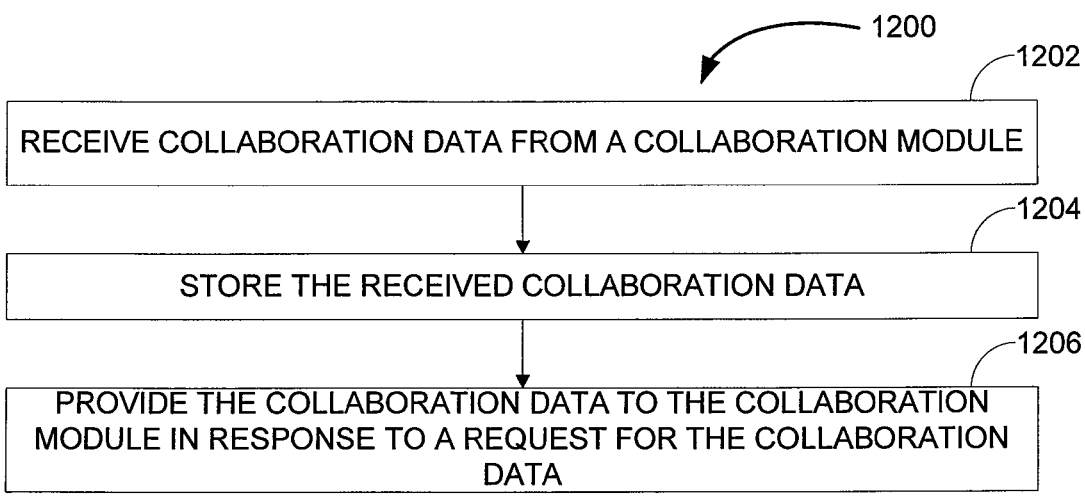
FIG. 12 is a flow diagram of a method according to an example embodiment.

FIG. 12 is a flow diagram of a method 1200 according to an example embodiment. The method 1200 is an example of a method that may be performed by a recording module on a collaboration server. The method 1200 may include receiving 1202 collaboration data from a collaboration module, such as a collaboration module performing the method 1100 of FIG. 11. The method 1200 may further include storing 1204 the received collaboration data and providing 1206 the collaboration data to the collaboration module, or other requestors, in response to a request for the collaboration data. The other requestors may include collaboration session participants and other processes or users.

Storing 1204 the received collaboration data may include storing 1204 the collaboration data in an associative manner with a collaboration session identifier to facilitate retrieval of the stored data. The collaboration data may also be stored in a synchronized manner to allow the stored collaboration data to be retrieved in a time-oriented manner. For example, the synchronized manner of storage may be in reference to a timeline of a respective collaboration session with a starting point of 00:00:00 and an endpoint of a greater time value.

Figure 13:
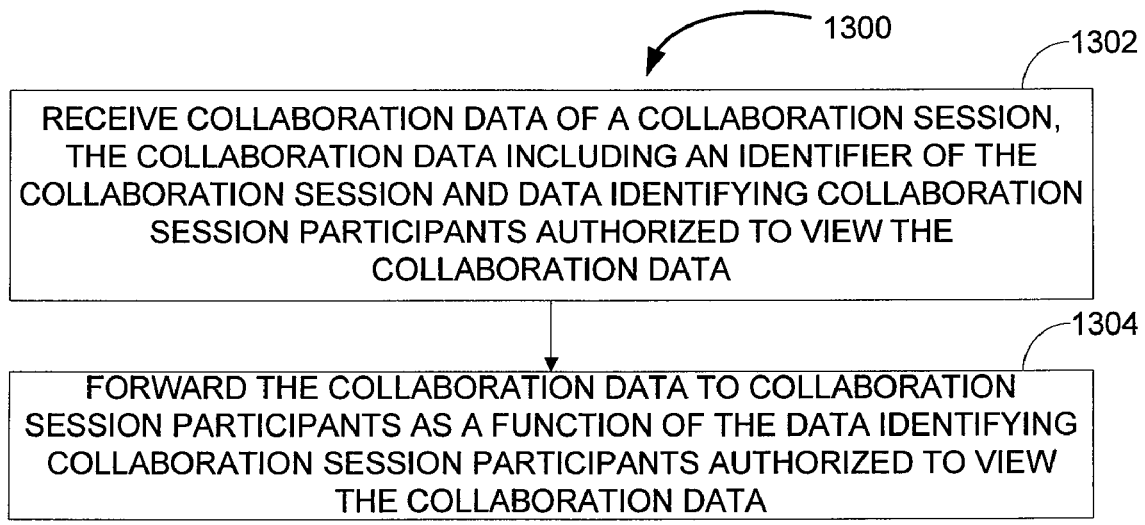
FIG. 13 is a flow diagram of a method according to an example embodiment.

FIG. 13 is a flow diagram of a method 1300 according to an example embodiment. The method 1300 is an example of a method that may be performed by a collaboration services module, such as the collaboration services module 112 of FIG. 1, to process private collaboration data intended for viewing by less than all collaboration session participants. The method 1300 may include receiving 1302 collaboration data of a collaboration session, the collaboration data including an identifier of the collaboration session and data identifying collaboration session participants authorized to view the collaboration data. The collaboration data may be received, for example, in the form of a collaboration data data structure such as is illustrated in FIG. 5 and FIG. 6.

The method 1300 may further include forwarding 1304 the collaboration data to collaboration session participants as a function of the data identifying collaboration session participants authorized to view the collaboration data. The data identifying collaboration session participants authorized to view the collaboration data may include user identifiers of less than all collaboration session participants.

The method 1300 may also include storing public and private collaboration data of the collaboration session and subsequently receiving a request for the collaboration data from a requestor, the request including a user identifier of the requestor. The method 1300, in such instances, may then operate to retrieve the stored collaboration data as a function of the user identifier of the requestor. In some embodiments, the result set of the retrieving activity includes only collaboration data including the user identifier of the requestor and other public collaboration data without viewing restriction. The result set is transmitted to the requestor. Such requests for stored collaboration data may be initiated by a client computer application that requests the collaboration data at a time other than when the collaboration data is received 1302 as part of the method 1300.

Another embodiment is in the form of a client computing device including an instruction set defining a collaboration module stored thereon and executable by a processor of the device. The collaboration module in such embodiments is operable to establish and maintain a network connection over the network interface with a collaboration server and to request and receive collaboration data of a recorded collaboration session from the collaboration server. The collaboration data may include including public and private collaboration data. The private collaboration data may or may not be encrypted, depending on the particular embodiment. When encrypted, the collaboration module is operable to identify encrypted private collaboration data and attempts to decrypt it with an encryption key. The collaboration module presents the collaboration data and public collaboration via one or more output devices, such as a monitor or an audio output device, such as a sound card. The collaboration data may be received by the collaboration module as a stream of collaboration data of a recorded collaboration session.

The collaboration module of the client computing device is also typically operable to receive collaboration session input designated for viewing only by certain viewers and encrypt a data representation of the received collaboration session input. The collaboration module further assembles a collaboration data data structure as a function of the received collaboration session input, such as the collaboration data data structures of FIG. 7. The collaboration data data structure is then sent to the collaboration server.

Figure 14:
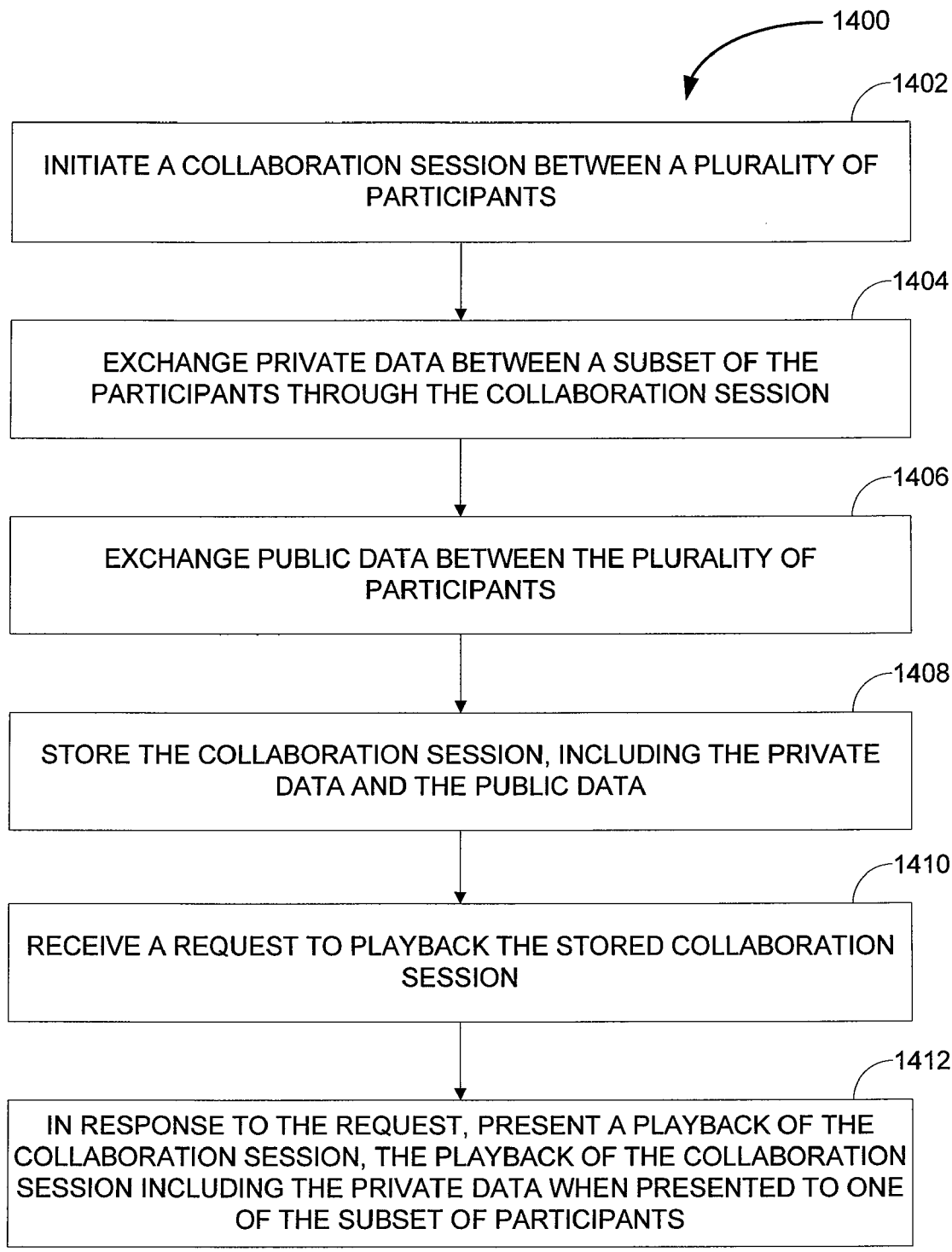
FIG. 14 is a flow diagram of a method according to an example embodiment.

FIG. 14 is a flow diagram of a method 1400 according to an example embodiment. The method 1400 is another example of a method that may be performed by a collaboration services module on a collaboration server. The method 1400 includes initiating 1402 a collaboration session between a plurality of participants and exchanging 1404 private data between a subset of the participants through the collaboration session and exchanging 1406 public data between the plurality participants. The method 1400 further includes storing 1408 the collaboration session, including the private data and the public data, such as in a time representative manner with regard to a time particular data elements are received.

The method 1400 may also include receiving 1410 a request to playback the stored collaboration session. The request may be a real-time request to view the collaboration session live. However, the request may also be a request to view a playback of a stored 1408 collaboration session at a time other than when the data of the collaboration session is exchanged 1404. For example, in response to such a request to view a playback of a stored 1408 collaboration session, the method 1400 may include presenting 1412 a playback of the collaboration session including the private data when the collaboration session is presented to one of the subset of participants. Presenting 1412 the playback of the collaboration session may include retrieving the public and private collaboration session data from a data store, such as a database, and serving the retrieved data over a network to the requestor.

In some embodiments of the method, the private data exchanged within a collaboration session, when received by a server performing the method 1400, includes user identifiers of a plurality of collaboration participants, the user identifiers defining the subset of the participants. The subset of participants may include two participants, three participant, or more participants depending on the particular embodiment and the use of such embodiments when implemented.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   initiating a collaboration session over a computer network between a plurality of participants;
   exchanging, over the computer network, private data between a subset of the participants through the collaboration session;
   exchanging, over the computer network, public data between the plurality of participants;

storing, on a data storage device, the collaboration session, including the private data and the public data;

receiving, over the computer network, a request to playback the stored collaboration session;

in response to the request, presenting, over the network, a playback of the collaboration session, the playback of the collaboration session including all public data and the private data only when presented to one of the subset of participants, wherein the public and private data include data identifying a module or application involved in the collaboration session and an action to be replicated within the identified module or application of a computing environment to which the playback of the collaboration session is provided, the data identifying the action to be replicated, during playback, comprising input to the identified module or application to cause the identified action to be replicated.

2. The computerized method of claim 1, wherein the exchanged private data, when received, includes user identifiers of a plurality of collaboration participants, the user identifiers defining the subset of the participants.

3. The computerized method of claim 1, wherein the subset of participants includes three or more participants.

4. The computerized method of claim 1, wherein the request to playback the stored collaboration session is received at a time other than when data of the collaboration session is originally exchanged.

5. A non-transitory computer-readable medium, with instructions stored thereon that are executable by a computing device to cause the computing device to:

store received collaboration data of a collaboration session, the collaboration data including public data and private data, the private data including data identifying at least one collaboration session participant authorized to view the private data;

receive, from a requestor, a request to view the collaboration session, the request including data identifying the requestor; and retrieve and send to the requestor all of the public collaboration data and only private collaboration data the requestor is authorized to view as a function of the data identifying the requestor, wherein the public and private data include data identifying a module or application involved in the collaboration session and an action to be replicated within the identified module or application of a computing environment to which the playback of the collaboration session is provided, the data identifying the action to be replicated, during playback, comprising input to the identified module or application to cause the identified action to be replicated.

6. The non-transitory computer-readable medium of claim 5, wherein sending the public and private collaboration data to the requestor includes streaming the collaboration data to the requestor.

7. The non-transitory computer-readable medium of claim 5, wherein:

the data identifying at least one collaboration session participant authorized to view the private data includes data identifying a group of participants;

the retrieving and sending of the public and private collaboration data to the requestor as a function of the data identifying the requestor comprises:

identifying groups the requestor is a member of and retrieving collaboration data the requestor is explicitly allowed view and is allowed to view as a member of the identified groups.

8. A non-transitory computer-readable medium, with instructions operable to cause a computing device to:

receive first input to join a collaboration session facilitated by a collaboration service of a remote server on a network, the collaboration session already in progress;

receive collaboration data of the collaboration session over the network from the collaboration service, the collaboration data including public collaboration data and private collaboration data;

receive second input to rewind a view of the collaboration session to a time location prior to when the collaboration session was joined;

request collaboration data over the network from the collaboration service beginning at the time location;

receive the collaboration data beginning at the time location over the network, the collaboration data including public and private collaboration data, wherein the public and the private data include data identifying a module or application involved in the collaboration session and an action to be replicated within the identified module or application, the data identifying the action to be replicated, during playback, comprising input to the identified module or application to cause the identified action to be replicated; and presenting the received collaboration data beginning at the time location, the presenting performed by replicating actions identified in the public and private data within respective modules or applications identified in the public and private data.

9. The non-transitory computer-readable medium of claim 8, wherein the private collaboration data comprises collaboration data with viewing restrictions limiting viewing to less than all potential viewers of the collaboration session.

10. The non-transitory computer-readable medium of claim 8, with further instructions operable to cause the computing device to:

receive a third input to pause the presenting of the received collaboration data; and pausing the presenting of the received collaboration data.

11. The non-transitory computer-readable medium of claim 8, with further instructions operable to cause the computing device to:

receive a third input designating a playback speed of the collaboration data received in response to the second input, wherein presenting the received collaboration data includes presenting the received collaboration data at the designated playback speed.

12. The non-transitory computer-readable medium of claim 11, with further instructions operable to cause the computing device to:

when presenting the received collaboration data at the designated playback speed, switch to a live mode of presenting the received collaboration data upon reaching a forward edge of a live collaboration session.

13. The non-transitory computer readable medium of claim 12, with further instructions operable to cause the computing device to:

receive a fourth input while in the live mode of presenting the received collaboration data, the fourth input including collaboration session input; and transmit data representative of the fourth input to the collaboration service to forward to other collaboration session participants.

14. The non-transitory computer readable medium of claim 13, wherein the collaboration session input of the fourth input includes text of a text-based message.

* * * * *